(12) United States Patent
Czezatke et al.

(10) Patent No.: US 7,707,185 B1
(45) Date of Patent: Apr. 27, 2010

(54) ACCESSING VIRTUAL DATA STORAGE UNITS TO OFFLOAD OPERATIONS FROM A COMPUTER SYSTEM HOSTING A VIRTUAL MACHINE TO AN OFFLOAD SERVER

(75) Inventors: Christian Czezatke, San Francisco, CA (US); Bich Cau Le, San Jose, CA (US); Krishna Yadappanavar, Sunnyvale, CA (US); Shaw C. Chuang, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 432 days.

(21) Appl. No.: 11/584,395

(22) Filed: Oct. 19, 2006

(51) Int. Cl.
*G06F 7/00* (2006.01)
*G06F 17/00* (2006.01)
*G06F 9/455* (2006.01)

(52) U.S. Cl. .................... 707/649; 707/650; 718/1
(58) Field of Classification Search ......... 707/202–204; 711/162; 718/1
See application file for complete search history.

(56) References Cited

U.S. PATENT DOCUMENTS

| | | | | |
|---|---|---|---|---|
| 6,075,938 | A * | 6/2000 | Bugnion et al. ............ 703/27 |
| 6,260,069 | B1 * | 7/2001 | Anglin .................... 709/229 |
| 6,442,682 | B1 * | 8/2002 | Pothapragada et al. ...... 713/1 |
| 6,625,623 | B1 * | 9/2003 | Midgley et al. ............ 707/204 |
| 6,795,966 | B1 * | 9/2004 | Lim et al. ................ 718/1 |
| 6,799,189 | B2 * | 9/2004 | Huxoll .................... 707/204 |
| 7,035,880 | B1 * | 4/2006 | Crescenti et al. .......... 707/204 |
| 7,076,509 | B1 * | 7/2006 | Chen et al. ............... 707/202 |
| 7,165,156 | B1 * | 1/2007 | Cameron et al. ........... 711/162 |
| 7,213,065 | B2 * | 5/2007 | Watt ...................... 709/223 |
| 7,213,246 | B1 * | 5/2007 | van Rietschote et al. .... 718/1 |
| 7,225,210 | B2 * | 5/2007 | Guthrie, II. .............. 707/205 |
| 7,370,164 | B1 * | 5/2008 | Nagarkar et al. .......... 711/162 |
| 7,484,208 | B1 * | 1/2009 | Nelson .................... 718/1 |
| 7,581,229 | B2 * | 8/2009 | Watkins et al. ............ 719/321 |
| 2004/0010787 | A1 * | 1/2004 | Traut et al. ............... 718/1 |
| 2004/0172574 | A1 * | 9/2004 | Wing et al. ................ 714/4 |

* cited by examiner

*Primary Examiner*—James Trujillo
*Assistant Examiner*—Jorge A Casanova
(74) *Attorney, Agent, or Firm*—Rajeev Madnawat

(57) ABSTRACT

A process of providing access to data associated with a virtual machine running on a host computer system to an offload server is implemented to improve the performance of the host computer system. Once the offload computer system knows how and where to access the data associated with that of the virtual machine, operations can be offloaded from the host computer system and performed by the offload server. Backup operations can be offloaded onto the server. The server can run backup software and directly access the data associated with the virtual machine, thereby freeing the hardware resources of the host computer to handle normal applications running on the virtual machine.

21 Claims, 5 Drawing Sheets

ACCESSING VIRTUAL DATA STORAGE UNITS TO OFFLOAD OPERATIONS FROM A COMPUTER SYSTEM HOSTING A VIRTUAL MACHINE TO AN OFFLOAD SERVER

BACKGROUND OF THE INVENTION

1. Field of the Invention

This invention relates to providing logical blocks of data stored by a virtual machine for access by a server so that operations can be offloaded from the computer hosting the virtual machine onto the server for execution.

2. Description of the Related Art

Typically, computers are dedicated to individuals or to specific applications. For example, an individual owns or is assigned his or her own personal computer (PC). Each time a business hires an employee whose job entails access to a computer, a new PC would be purchased and installed for that new hire. In other cases, a PC or server may be used to perform a specific task. For example, a corporation could have a server for hosting the company's web site, another server for handling emails, and yet another server for handling financial transactions. This one-to-one paradigm was simple, straightforward, flexible, and readily upgradeable. However, one drawback to this set-up is that it is inefficient from a computer resource perspective.

The inefficiency stems from the fact that most software applications do not fully utilize the full processing potential of the computer upon which that software is installed. Software applications do not push the envelope set by hardware constraints. Furthermore, some applications may consume a great deal of processing power, while other computer applications are inherently less computing intensive. When the PC or server is running less computationally intensive applications, much of its hardware resources are underutilized. Furthermore, given hundreds or thousands of computers networked in an enterprise, the cumulative effect of the amount of wasted computing resources adds up.

In an effort to take advantage of all the underutilized computing resources, there have been efforts to design "virtual" machines. Basically, a virtual machine entails loading a piece of software onto a physical "host" computer so that more than one user can utilize the resources of that host computer. In other words, the virtual software package is loaded onto one or more physical host computers so that the processing resources of the host computers can be shared amongst many different users. By sharing computing resources, virtual machines make more efficient use of existing computers. Moreover, each user accesses the host computer through their own virtual machine. From the viewpoint of the user, it appears as if they were using their own computer. Users can continue to operate in a manner that they had grown accustomed to in interacting with computers. Thus, rather than buying, installing, and maintaining new computers, companies can simply load virtual machine software to get more leverage off their existing computers. Furthermore, virtual machines do not entail any special training because they run transparent to the user. In addition, virtual machines have the ability to run multiple instances of different operating systems concurrently on the same host or a group of hosts.

Unfortunately, there is one drawback manifest in exploiting virtual machines to their full potential. Because virtual machines are designed to maximize the most efficient use of the computing resources, there is typically not very much spare computing resources left over. Spare computing resources are often used to host another virtual machine for another user or application. It is this very economic efficiency which poses serious issues with certain types of applications. Some applications are run infrequently, but when they do execute, these applications are extremely computing intensive.

For example, backup applications are often used to backup a company's data. The data is backed up periodically and stored in backup files so that if there happens to be a computer crash or disk failure, user error (e.g., accidental file deletes), administration errors, etc., important data is not irretrievably lost. Backing up files is an important function, but it only needs to be run periodically. However, when it does run, it can consume a great deal of computing resources in terms of input/output (I/O) and so processing bandwidth, and network bandwidth. Furthermore, backups are typically run within a certain time window, usually during non-peak times. This poses a problem with virtual machines because if all production servers of a data center were to be backed up at the same time, the backup process would overwhelm the capabilities of the physical host computers. What normally would take hours for backup operations running on a normal, non-virtualized server could take substantially longer for servers hosting virtual machines. Not only would the backup operations take longer to perform on virtualized servers, the backup operations could seriously degrade the performance of applications being run on these virtual machines. Furthermore, the transfer of data during backups could congest the computer network and slow down normal network traffic. And one cannot simply add a dedicated physical server to offload the backup operations because the physical server has no knowledge of how to access the data stored by the virtual machines.

SUMMARY OF THE INVENTION

The present invention pertains to a process of providing metadata to an offload physical server so that it knows where data associated with a virtual machine is physically stored. Once the offload server has this metadata, it can now directly access so the "virtual" data associated with that of the virtual machine. Consequently, the offload server can operate on the virtual data without impacting the functionality of the computer system hosting the virtual machine. In one embodiment, the invention is used to efficiently perform backup operations by offloading the backup operations onto a server separate from the computer running the virtual machine. The backup server obtains the metadata which specifies a logical to physical mapping of the files and data associated with the virtual machine. The backup server directly reads the data from the specified locations in physical memory and writes the data so that it can be archived for backup purposes. By running the backup software on the server, hardware resources of the computer hosting the virtual machine are not impacted by the backup process. Consequently, hardware resources can be devoted to running normal applications on the virtual machine with little to no impact from the backup operations conducted by the server. Moreover, the data retrieval can be transmitted over a dedicated link which means it does not consume network bandwidth used by the virtual machine.

DETAILED DESCRIPTION

The present invention pertains to a process of providing access to data associated with a virtual machine running on a host computer system to an offload computer system. Once the offload computer system knows how to access the data associated with that of the virtual machine, operations can be offloaded from the host computer system and performed by the offload computer system. In one embodiment, a virtual machine running on the host computer system stores data by means of one or more virtual data storage units. These virtual data storage units are comprised of logical blocks of data residing in a physical data storage unit, such as a disk array. Applications and file systems running on the virtual machine are quiesced. A snapshot is taken. A blocklist protocol provides the logical to physical mappings corresponding to the snapshot. Once these mappings are provided to the offload computer system, the offload computer system can directly access the physical data storage unit to obtain the data. Thereupon, the offload computer system can run standard backup software to store the data pertaining to the virtual machine onto backup media. This process is advantageous in that by offloading the backup operations onto the offload computer system, it relieves the host computer system from having to perform the backup. The host computer system can now allocate its valuable hardware resources to the applications running on the virtual machine. Furthermore, quiesceing the virtual machine and taking a snapshot takes minimal time to execute. Consequently, there is minimal disruption to applications running on the virtual machine. Another advantage is that the offload server can directly access the data from the physical storage unit through a dedicated link. The data is transmitted from the physical data storage unit to the offload computer system over this dedicated link. As a result, bandwidth over the existing network servicing the host computer system is not consumed by the offloaded backup operations.

Figure 1:
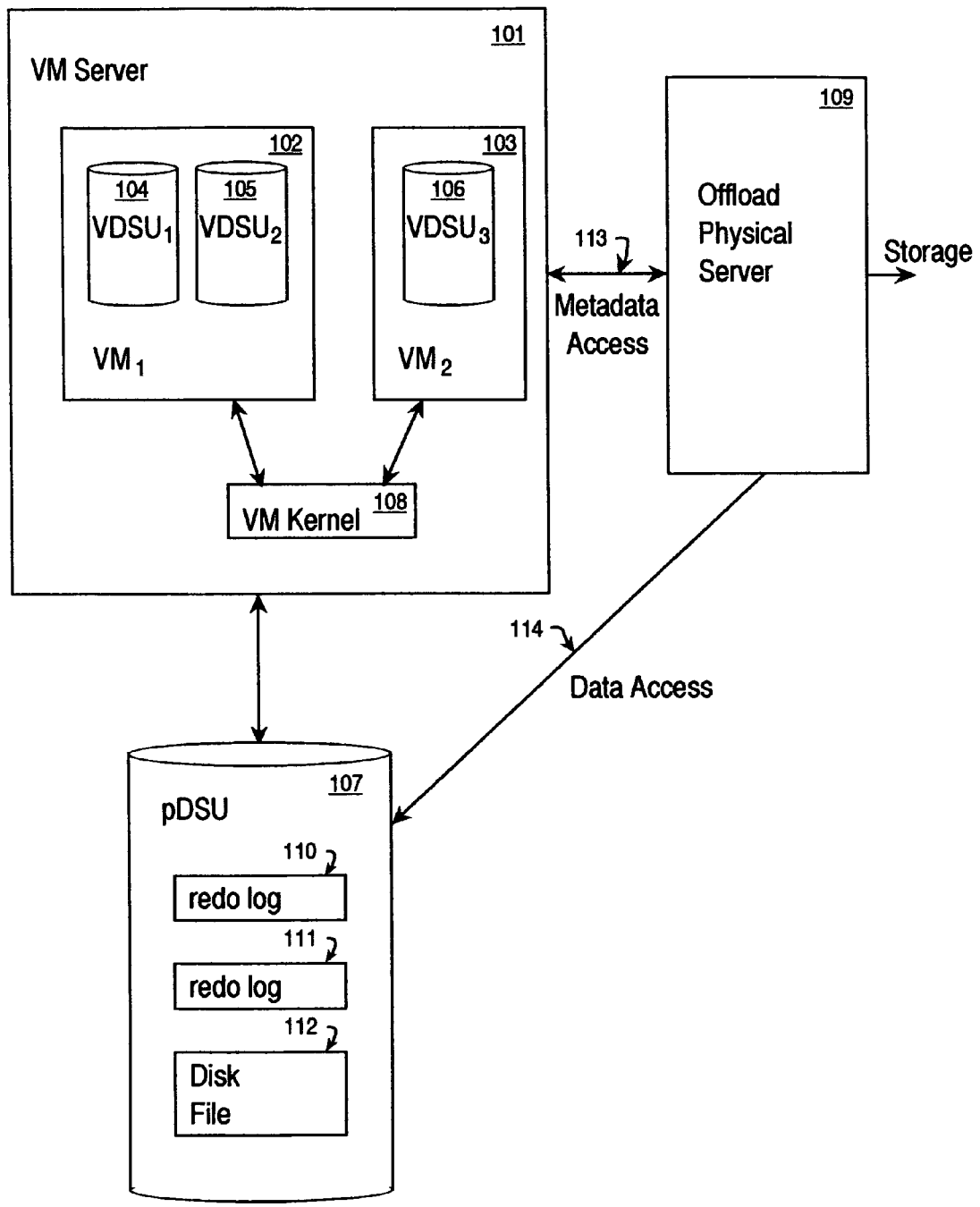
FIG. 1 shows a system upon which embodiments of the present invention may be practiced.

FIG. 1 shows a system upon which embodiments of the present invention may be practiced. As shown, a virtual machine server 101 is a physical server which hosts one or more virtual machines 102 and 103. Each of the virtual machines 102 and 103 can have one or more virtual data storage units (e.g., virtual data storage units 104-106). A virtual data storage unit is defined as any device (software or hardware) which is used to store data or instructions for use or generated by the various virtual machines running on the virtual server. A virtual data storage unit acts as an atomic storage unit for one or more applications running on an operating system corresponding to a virtual machine.

In one embodiment, a virtual machine infrastructure enables users to take point in time copies of the virtual data storage units called snapshots. For example, a snapshot represents the contents of virtual data storage units 104-105 at a specific, known time for VM 102. The snapshot provides a consistent, immutable view of the data on the virtual data storage units 104-105. This snapshot has its own configuration file and the saved device state of the virtual machine. When a snapshot is taken, the VM kernal 108 creates one or more redo logs 110-111. The redo logs 110-111 are associated with the virtual disk storage units 104-105. Future writes occurring after the snapshot, are contained in these redo logs. In this way, virtual machine 102 can continue with its operation after the snapshot is taken. Furthermore, future writes are prevented from changing the contents of the disk file 112. Consequently, disk file 112 provides a consistent, immutable file image of the data corresponding to virtual machine 102 at the time the snapshot was taken. It should be noted that a virtual data storage unit can be snapshotted more than once. Also, although in one implementation the present invention utilizes redo logs, other methods can be utilized to capture disk state deltas that the virtual machine accumulates after the snapshot. All the data on the virtual data storage units 104-106 and the snapshot of the virtual data storage units reside on a physical data storage unit (pDSU) 107.

Since the application(s) running on the virtual machines 102-103 are unaware of the fact that they are running on a virtual data storage unit or snapshot of the virtual data storage unit, a user can take the backup copy of the data after taking a snapshot of the virtual data storage unit. Advanced storage access protocols allow multiple servers to access the data using storage area networks (SAN) or network access. An offload physical server (OPS) 109 can have access to the pDSU 107 hosting the virtual data storage units 104-106 and its snapshot using the SANs data access 114. The physical server 101 hosting the virtual machines 102 and 103 does not use its own resources to take the backup copy of the data residing on the virtual data storage units 104-106. Furthermore, there is little to no downtime for the application(s) running in the virtual machines 102 and 103. In one embodiment, application independent data stored in the virtual data storage unit and storage protocol specific information are used to identify a virtual data storage unit for the second host or offload physical server. A generic framework to access a physical block on pDSU 107 for a corresponding logical block on the virtual data storage units 104-106 is defined. This metadata is sent over line 113 to the offload physical server 109.

The offload physical server 109 or some other second host uses this framework to access the data directly from the pDSU 107 from all the virtual data storage unit blocks that need to be copied for the backup. The offload physical server 109 can then use standard backup software to store the data onto a backup media either directly or through an agent. Thereby, the backup function for all the virtual machines is successfully and efficiently offloaded from the virtual machine server 101. It should be noted that the second host or offload physical server can be used to perform any resource intensive operations such as virus scanning, data mining, etc. and is not limited to backups. Although the detailed description of the invention highlights backups, the present invention is not limited to being used only for backup operations but has other applications as well.

Figure 2:
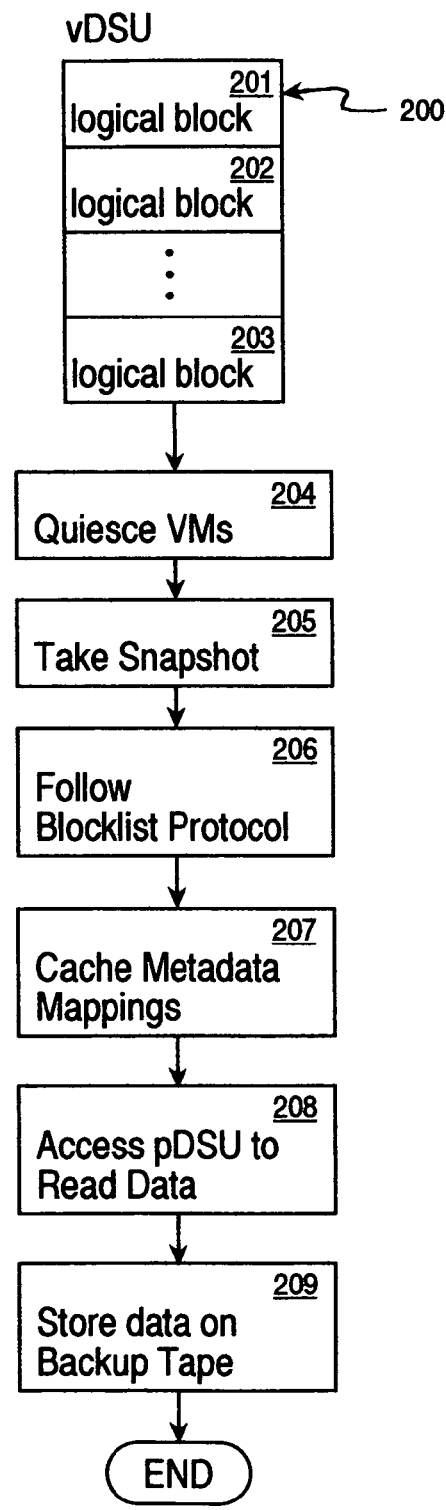
FIG. 2 is a process flow diagram showing the procedure for identifying one or more virtual data storage unit for the second host.

FIG. 2 is a process flow diagram showing the procedure for identifying one or more virtual data storage unit for the second host. Basically, the virtual data storage unit 200 in a virtual machine is implemented as a logical entity with a set of logical blocks 201-203. These logical blocks 201-203 can be a file, logical volume, or a pDSU acting as a virtual data storage unit. The virtual data storage unit is composed of the physical blocks 201-203 on the pDSU in the case of a logical entity. The server which hosts the virtual machines using the virtual data storage units has access to one or more of the pDSU using storage area networks. The first step 204 in the process entails quiesceing the various applications running on the virtual machines. Any standard sync module can be used to quiesce the virtual machines. This ensures that there are no I/O operations in-flight and ensures a consistent application state. As part of the quiesceing step, intermediate states are flushed to the virtual data storage unit. After a sync state, a snapshot for a virtual data storage unit is taken, step 205.

This snapshot represents a point in time image of the virtual data storage unit. This can be implemented as a copy on write mechanism for the writes from the guest operating system in the virtual machine to the virtual data storage unit at the logical block abstraction. The snapshot is instantaneous, and hence there is no downtime for the applications running on the virtual machines hosted by the VM server.

The offload physical server has direct access to the pDSU using the storage area network or any other network access protocol. This server implements a blocklist protocol 206. The blocklist protocol gets the logical to physical mappings from the virtual machine server for the virtual data storage units and snapshot of the virtual data storage units. These mappings vary, depending on how the virtual data storage unit is implemented on the virtual machine server. An example of a mapping is:

<virtual data storage unitx, voffset>===><pDSCy, pOffset, length>

This mapping defines for a given voffset on the virtual data storage unit, there exists a corresponding unique pDSUy with the pOffset; the length indicates the set of pDSU physical blocks which are contiguous. The mappings can be obtained from the virtual machine server using any of the publicly available protocols. The offload physical server caches the metadata mappings in step 207 to avoid having to go over the network to obtain the mappings from the virtual machine server. Using these mappings, the offload physical server directly accesses the pDSU to read the data as depicted in step 208. The data is then stored onto backup tape, step 209. In another embodiment, it is possible to create a disk image which can then be used for backup purposes. Once the disk images are created, they can be used by an offload physical server dedicated for backup purposes. It is also possible to use some kind of specific protocol that enables other machines to access the disk image. This can be done through a network-specific protocol, such as a standard file sharing protocol. In another embodiment, once the file system within the disk image is accessible by the operating system running in the offload physical server, standard backup software installed in the offload physical server can be used to perform the file-level backup.

Figure 3:
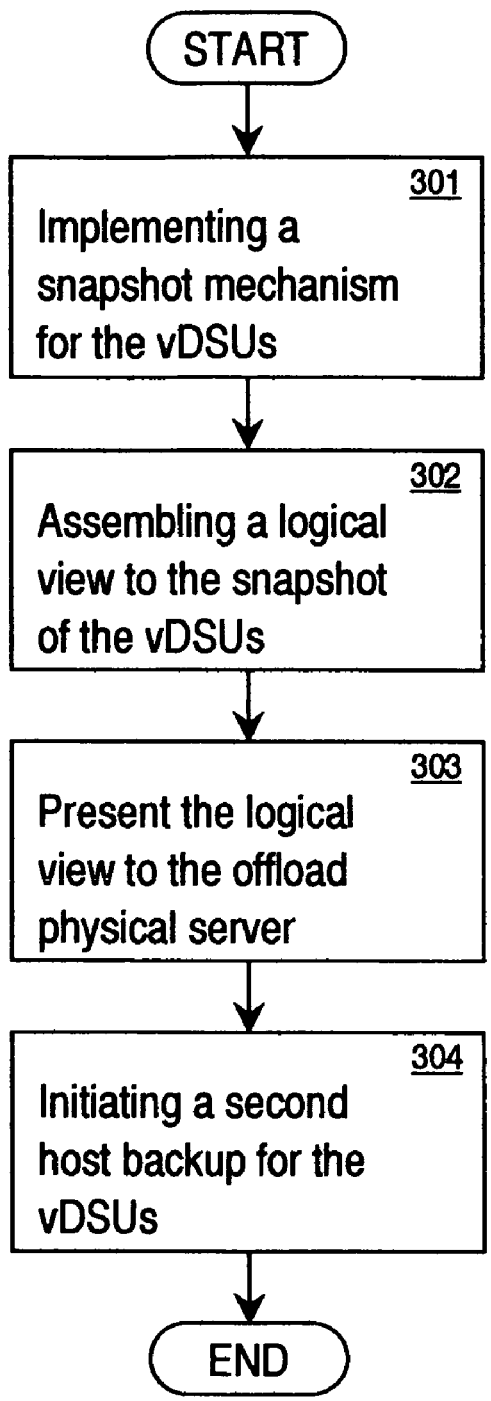
FIG. 3 shows a process for implementing a second host backup system for backing up a virtual machine according to one embodiment of the present invention.

FIG. 3 shows a process for implementing a second host backup system for backing up a virtual machine according to one embodiment of the present invention. In block 301, a snapshot mechanism for the vDSUs is implemented. In block 302, a logical view of the snapshot of the vDSUs is assembled. This logical view is then presented to the offload physical server in block 303. Thereupon, a second host backup for the vDSUs is initiated by a second host backup computer in block 304.

Figure 4:
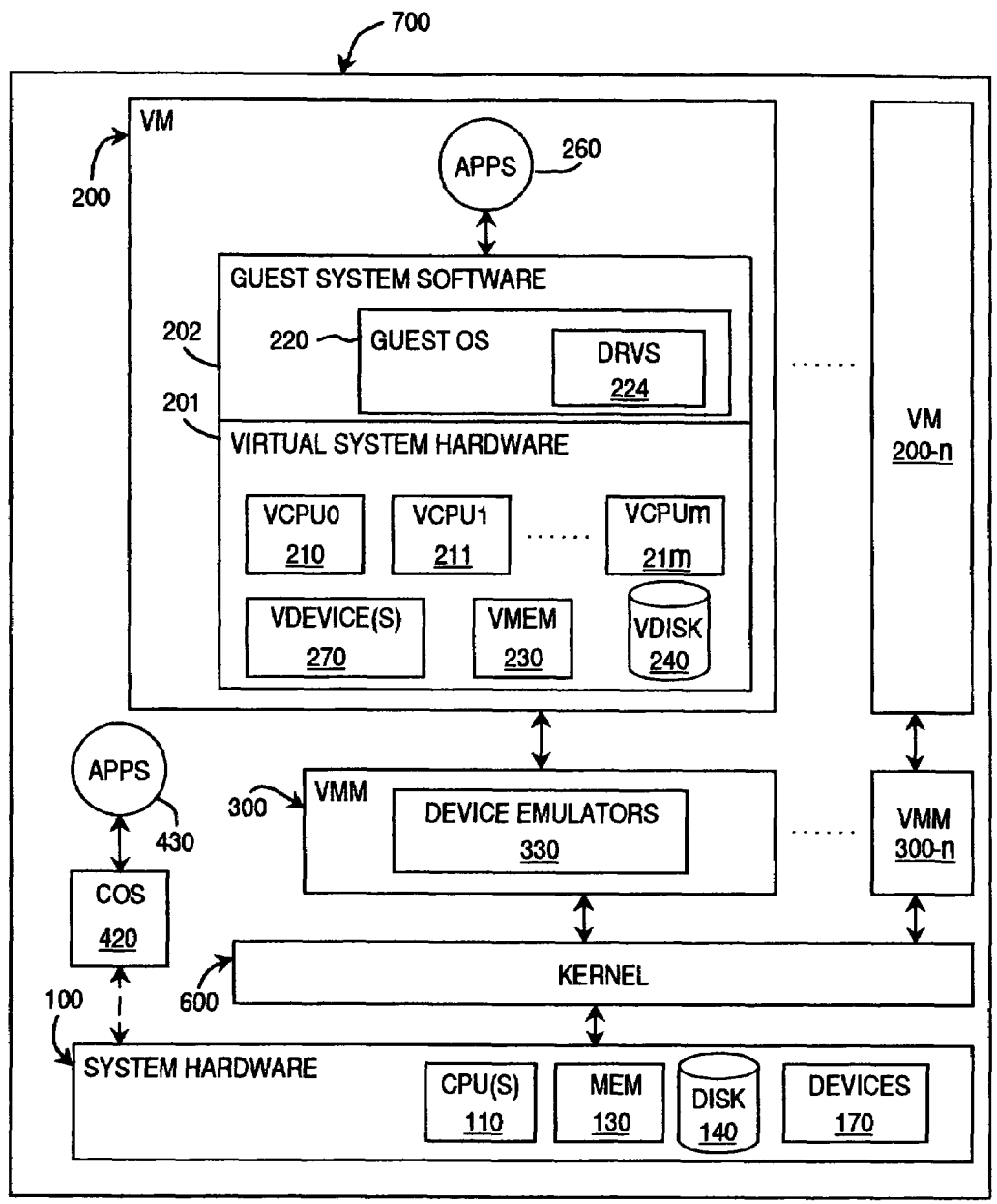
FIG. 4 shows one possible arrangement of a computer system that implements virtualization.
Figure 5:
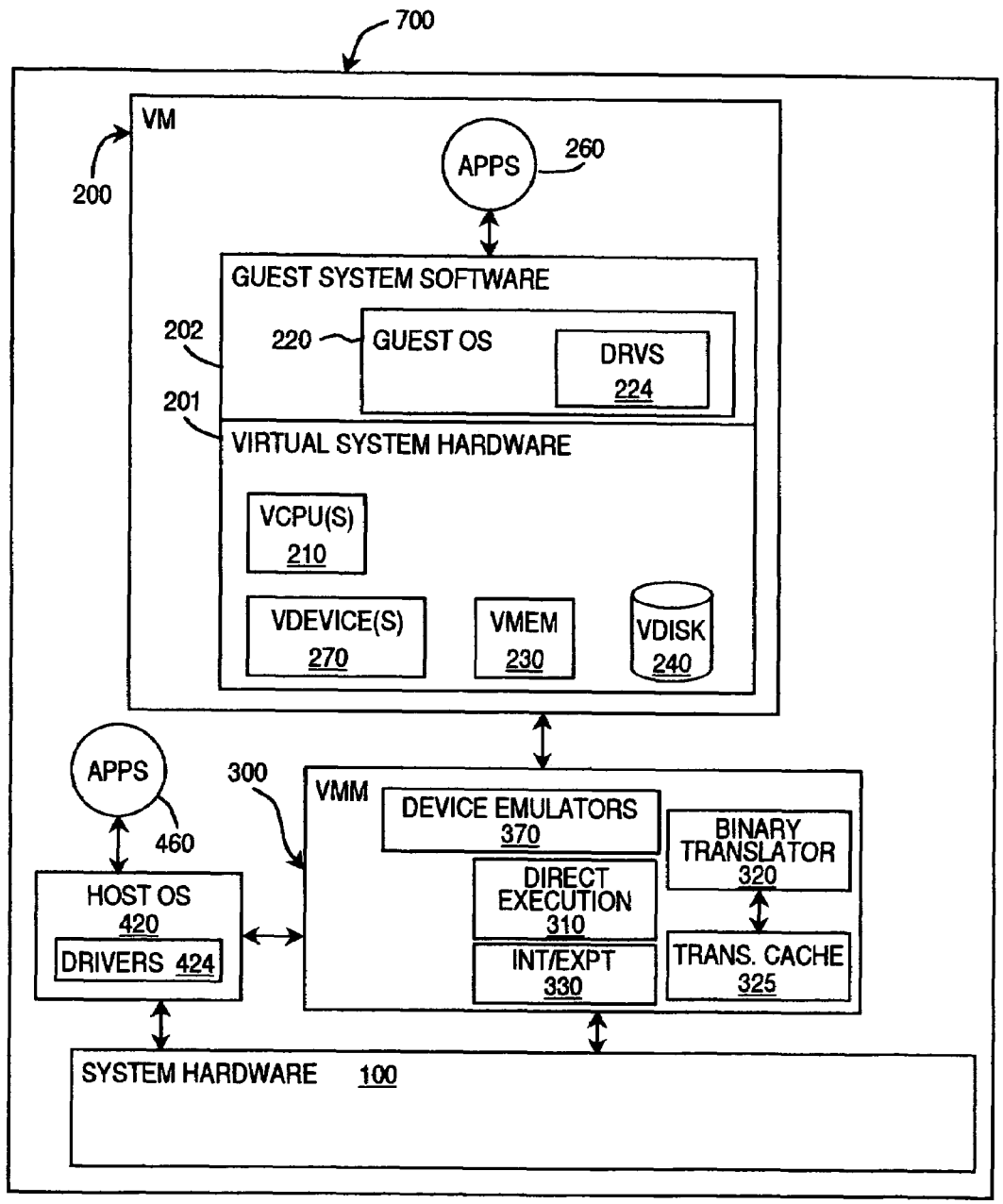
FIG. 5 also illustrates detailed components that are also often included in the VMM of a hosted virtualization system.

FIGS. 4 and 5 show a virtual machine and its functions. As is well known in the field of computer science, a virtual machine (VM) is a software abstraction—a "virtualization"—of an actual physical computer system. FIG. 4 shows one possible arrangement of a computer system 700 that implements virtualization. A virtual machine (VM) 200, which in this system is a "guest," is installed on a "host platform," or simply "host," which will include a system hardware 100, that is, a hardware platform, and one or more layers or co-resident components comprising system-level software, such as an operating system (OS) or similar kernel (or hypervisor), a virtual machine 247 monitor, or some combination of these.

As software, the code defining the VM will ultimately execute on the actual system hardware 100. As in almost all computers, this hardware will typically include one or more CPUs 110, some form of memory 130 (volatile and/or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware vendors have proposed, and are presumably developing, hardware processors that include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk or storage device 240, and one or more virtual devices 270. Note that a storage disk virtual 240 or physical 140 is also a "device," but is usually considered separately because of the important role it plays. All of the virtual hardware components of the VM may be implemented in software to emulate corresponding physical components. The guest system software typically includes a guest operating system (OS) 220 and drivers 224 as needed, for example, for the various virtual devices 270.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Applications may be installed within the VM in a conventional manner, using the guest OS. Then, the guest OS retrieves files required for the execution of such installed applications from the virtual disk in a conventional manner. The design and operation of virtual machines in general are known in the field of computer science.

Some interface is usually required between a VM 200 and the underlying host platform (in particular, the hardware CPU(s) 110 and any intermediate system-level software layers), which is responsible for actually submitting and executing VM-issued instructions and for handling I/O operations, including transferring data to and from the hardware memory 130 and storage devices 140. A common term for this interface or virtualization layer is a "virtual machine monitor" (VMM), shown as component 300. A VMM is usually a software component that virtualizes at least some of the resources of the physical host machine, or at least some hardware resource, so as to export a hardware interface to the VM corresponding to the hardware the VM "thinks" it is running on. As FIG. 4 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in the VMM. One advantage of such an arrangement is that the VMM may (but need not) be set up to expose "generic" devices, which facilitate, for example, migration of VM from one hardware platform to another.

In contrast to a fully virtualized system, the guest OS 220 in a so-called "para-virtualized" system is modified to support virtualization, such that it not only has an explicit interface to the VMM, but is sometimes also allowed to access at least one host hardware resource directly. In some para-virtualized systems, one of a plurality of VMs plays a "superior" role in that it mediates some requests for hardware resources made by the guest OSs of other VMs. In short, virtualization transparency is sacrificed to gain speed or to make it easier to implement the VMM that supports the para-virtualized machine.

In addition to the distinction between full and partial (para-) virtualization, two arrangements of intermediate system-level software layer(s) are in general use—a "hosted" configuration (illustrated in FIG. 5) and a non-hosted configuration (illustrated in FIG. 4). In a hosted virtualized computer system, an existing, general-purpose operating system forms a "host" OS that is used to perform certain input/output (I/O) operations, alongside and sometimes at the request and direction of the VMM 300. The host OS 420, which usually includes drivers 424 and supports applications 460 of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 5 also illustrates some of the other components that are also often included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320 with associated translation cache 325 may be included to provide execution speed while still preventing the VM from directly executing certain privileged instructions (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel (or "hypervisor") 600—constructed specifically to provide efficient support for the VMs. This configuration is frequently referred to as being "non-hosted." Compared with a system in which VMMs run directly on the hardware platform (such as shown in FIG. 5), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as any temporary "console" operating system 420 that, in some systems, is included to boot the system as a whole and for enabling certain user interactions with the kernel. The console OS in FIG. 4 may be of the same type as the host OS in FIG. 5, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005.)

As a generalization, some form of "virtualization software" executes between system hardware 100 and one or more VMs 200. The virtualization software uses the resources of the system hardware 100, and emulates virtual system hardware 201, on which guest system software 202 and guest applications 260 appear to execute. Thus, virtualization software typically comprises one or more device emulators, and either includes or executes in conjunction with some form of system software for accessing and controlling the system hardware 100. The virtualization software may provide full virtualization or partial virtualization. In the non-hosted virtual computer system of FIG. 4, the virtualization software may be considered to comprise the VMMs 300, along with some portions of the kernel 600, such as one or more software modules that may share physical system resources between multiple VMs. The virtualization software operates in conjunction with system software that is also contained in the kernel 600. Similarly, in the hosted virtual computer system of FIG. 5, the virtualization software may be considered to primarily comprise the VMM 300, which operates in conjunction with system software in the form of the host OS 420. Various other configurations for virtualization software and system software are also possible.

Thus, a process for offloading an application intended to be run on a virtual machine onto a second host is disclosed. This invention may be used to advantage in both a hosted and/or a non-hosted virtualized computer system, in which the included virtual machine(s) may be fully or para-virtualized, and in which the virtual machine(s) have any number of virtualized processors, which may be of any type (including multi-cored, multi-threaded, or some combination). The invention may also be implemented directly in a computer's primary OS, both where the OS is designed to support virtual machines and where it is not. Moreover, the invention may even be implemented wholly or partially in hardware, for example in processor architectures intended to provide hardware support for virtual machines. Although the detailed description is directed to a virtual machine environment, the present invention is not limited to be practiced only on virtual machines. In fact, the present invention is applicable to non-virtual computer systems as well. For example, the state information stored in volatile and/or non-volatile memory (e.g., registers, caches, and hard disks) for a physical computer can be copied and loaded onto another physical computer system. The transfer can be accomplished over a network. The application can be run on this second physical computer system. The results can be displayed, stored, or merged with the first physical computer system. Furthermore, one embodiment of the present invention can be in software form stored on a DVD, disk file, or some other type of computer-readable medium.

What is claimed is:

1. A method for providing access to disk data of a virtual machine running on a first computer system hosting the virtual machine to a second computer system:

storing data corresponding to the virtual machine as logical blocks in a physical persistent storage attached to the first computer system;

quiesceing all applications running on the virtual machine;

taking a snapshot of the data;

creating a logical to physical mapping for the snapshot of the data, wherein the mapping is provided by the virtual machine and stored within the snapshot of the data, wherein the mapping defines correlation between virtual blocks to which the virtual machine saves the data and physical blocks to which the data is persistently stored; and reading the data residing in the snapshot by the second computer system according to the mapping, without starting a virtual machine for the snapshot on the first computer system, wherein the second computer system reads data in the snapshot directly without using a virtual machine.

2. The method of claim 1 further comprising:
running backup software on the second computer system to backup the data corresponding to the virtual machine, wherein the second computer system directly accesses the data residing on the physical server according to the logical to physical mapping.

3. The method of claim 1, wherein the data corresponding to the virtual machine is stored in a virtual data storage unit.

4. The method of claim 1, wherein the accessing is enabled by the logical to physical mapping provided by the computer system hosting the virtual machine.

5. The method of claim 1 wherein the second computer system comprises an offload server which runs software to execute tasks on the data corresponding to the virtual machine with minimal impact to applications running on the virtual machine.

6. The method of claim 1 further comprising:
caching metadata which specify the logical to physical mapping.

7. A method for backing up a virtual machine running on a host computer system comprising:
presenting a copy of disk data corresponding to the virtual machine at a specific, known time;
creating a logical view of snapshot data, wherein the logical view is provided by the virtual machine and stored within the snapshot, wherein the logical view defines correlation between virtual blocks to which the virtual machine saves data and physical blocks to which the data is persistently stored;
accessing from a second computer the snapshot that is stored in the host computer according to the logical view to read the snapshot data directly without using a virtual machine and without starting a virtual machine for the snapshot on the host computer;
writing the data to a backup storage medium using the second computer system.

8. The method of claim 7 further comprising:
quiesceing the virtual machine before writing the copy of data.

9. The method of claim 7 further comprising:
installing backup software only on the second computer system to backup the data corresponding to the virtual machine.

10. The method of claim 7 further comprising:
defining a mapping which maps the logical view to locations of the physical persistent storage containing the snapshot data.

11. The method of claim 7 further comprising:
the second computer system directly reading the snapshot data from the physical persistent storage over a storage area network.

12. The method of claim 7 further comprising:
running an application on the virtual machine while virtual machine files are being backed up by the second computer system.

13. The method of claim 7, wherein the second computer system comprises an offload physical server.

14. The method of claim 7 further comprising:
transmitting metadata to the second computer system, wherein the metadata defines a plurality of logical to physical persistent storage mappings which are used by the second computer system to access the data to be backed up.

15. A computer system comprising:
a processor for running applications on a virtual machine;
an input/output interface coupled to the virtual memory for transmitting metadata which specifies a logical to physical mapping which is used by an external computer system to perform backup operations on the data stored in a disk memory, wherein the input/out interface is configured to provide the logical to physical mapping to external computer system and the external computer system accesses a snapshot of data of the virtual machine directly without using a virtual machine and without starting the virtual machine for the snapshot on the computer system, wherein the logical to physical mapping defines correlation between virtual blocks to which the virtual machine saves the data and physical blocks to which the data is persistently stored.

16. The computer system of claim 15 further comprising a plurality of virtual machines running on the computer system.

17. The computer system of claim 15 comprising a plurality of virtual data storage units for storing the data generated by the virtual machine.

18. The computer system of claim 15 further comprising a physical data storage unit coupled to the processor having blocks of data corresponding to the virtual machine, wherein these blocks of data are identified to the external computer system and are directly accessed through a dedicated link for backing up the blocks of data.

19. The computer system of claim 15, wherein the virtual machine is quiesced and a snapshot is taken for purposes of backup operations by the external computer.

20. The computer system of claim 15, wherein the external computer performs backup operations while applications are run on the virtual machine.

21. The computer system of claim 15, wherein the logical to physical mapping is specified according to a blocklist protocol.

* * * * *